Patented Apr. 30, 1929.

1,710,921

UNITED STATES PATENT OFFICE.

ROY CROSS, OF KANSAS CITY, MISSOURI, AND WILLIAM A. COLLINGS, OF SANTA MONICA, CALIFORNIA, ASSIGNORS TO SILICA PRODUCTS CO., OF LOS ANGELES, CALIFORNIA, A CORPORATION OF DELAWARE.

LIGHTWEIGHT CONCRETE AND PROCESS OF MAKING THE SAME.

No Drawing. Application filed March 25, 1925. Serial No. 18,308.

This invention relates to a composition of matter and a process of making the same, and refers more particularly to the production of a plastic or molding building material which may be used in the form of a plaster or mortar and may be molded into blocks, tiles, bricks or set in forms in the making of unitary walls, floors, roads or innumerable other types of building construction.

The application is a continuation in part of a prior application filed in the name of William A. Collings, Serial No. 680,044 dated December 11th, 1923.

The advantages of this material lie primarily in its waterproof qualities and its lightness of weight as compared with the usual concrete or mix used in building construction; also, its smoothness and plasticity making it easy to work and its uniform texture due to the fact that the ingredients are evenly distributed through the mass or aggregate and remain so while setting, avoiding the difficulties of segregation so common in connection with a mixture of this sort where a light filler is used which has a relatively lighter specific gravity than the matrix and the other materials of the mix.

While the waterproofing substance and leavening products may as well and as effectively be used with the usual type of concrete having a cement matrix with a calcareous and sand base or filler. It is thought that this phase of the invention is satisfactorily covered in the prior application referred to, while the present invention lies particularly in the use of a lighter filler material such as cinders and clay or ceramic products heated to intumescence. This plastic composition for building construction is admirably adapted for use in the place of concrete or cinder blocks which are extensively used in replacing brick and stone in basement walls, fire walls, curtain walls and similar constructions. The material has the required strength for being formed into outside walls and the desired lightness for interior curtain wall construction. As mentioned, too, it may be mixed as an aggregate and set in forms similarly to the ordinary concrete mix due to the fact that it has the quality of maintaining the ingredients uniformly distributed therethrough without separation or segregation of the water and the substances of different specific gravity. Broadly, the mix contains hydraulic cement with a fine or coarse filler, the total aggregate including the cement weighing, on a dry basis, not more than 130 pounds or less than 80 pounds per cubic foot as distinguished from a calcareous sand aggregate weighing from 140 to 160 pounds per cubic foot on a dry basis. There is no segregation of the materials in the raw mix which may carry from 8% to 20% of water.

While it is recognized that cinder blocks constitute a very valuable material for the above named purposes, they have the disadvantages that they are still relatively heavy and that they are porous to water owing to the size and large percentage of voids, are subject to disintegration by the action of sulphur, and cause corrosion with nails or other metals with which they come in contact. The particular quality of being capable of holding nails can be very much improved by the present invention, as it gives the block or wall a much more uniform and compact character. The present invention, furthermore, water-proofing the blocks, tiles or walls, prevents corrosion of metals in contact with them at the same time retaining the lightness of weight. This result is accomplished in the present invention by the addition to the ordinary block mixture or aggregate mixture of a gelatinous clay or hydrous aluminum silicate having the peculiar proclivities of swelling with the addition or presence of water. Such a material is a hydrous aluminum silicate found naturally in some of the Western States—such as Wyoming and California—and commonly known as "bentonite". Other clays of similar character, having the characteristic of swelling with water, may as well be used, as the essential quality is to fill the voids of the mix with the addition of moisture preventing the seeping of water or moisture through the blocks or wall after the concrete or mix has set. It is desirable, and of importance, to combine the waterproofing clay with the mix while the former is in intimate contact with an oil, such as kerosene, gas oil, spindle oils, crude oil or other liquid capable of preventing the immediate water contact. At this point, attention is called to the fact that this waterproofing material is not used as a retardent to dry or retard the setting of the concrete or mix. It is desirable to combine with the gelatinous clay, such as bentonite and oil, a percentage of diatomaceous earth which has a leavening effect upon the mix. A typical method of manufacture would be the following: To one part of air dried bentonite or gelatinous clay is added two parts of diatomaceous earth by weight. This is mixed to incipient plasticity with kerosene or other oil capable of evaporating very slowly or the kerosene may be omitted unless it is desired to get unusual waterproofing qualities and high density. A mixture is made of five parts of Portland cement, or other hydraulic cement, and ten parts of fine aggregate which is composed preferably of fine screenings of cinders, from which coal has been removed, or clay or shale-like material which has been heated to incipient intumescence. A coarse aggregate is then added in proportion of twenty parts. This coarse aggregate consists preferably of light but tough cinders or shale or clay like material which has been heated to considerable intumescence. The fine filler and the coarse filler are now put in a mixer and the bentonite and diatomaceous earth are added. While the mixer is running, sufficient water is added to give the right plasticity. Ordinarily, this amounts to about 15% by weight. When maximum density is not required, the oil or naphtha is not used. It will be found that this mixture has a very good plasticity and that the water does not segregate from the wet mix due, perhaps, to the qualities of the gelatinous clay of maintaining the ingredients in a relatively permanent suspension. The wet mix, when placed in a form, requires very little working and on account of the large amount of water carried, the desired lightness of weight is obtained. At the same time, on account of the bentonite or gelatinous clay, the mixture is more uniform in texture, of greater density, and the voids more completely filled,—giving an excellent average strength. As described, the diatomaceous earth has the characteristic of adding leavening qualities to the mix.

Using cinders or shale or clay treated to intumescence for making concrete is not new, but heretofore it has not been possible to attain a good plasticity and prevent separation of the water and aggregate due to the wide range of specific gravities of their ingredients and their peculiar adverse tendencies to combine. Furthermore, in the manufacture of the tiles, blocks or aggregate for unitary structures by mix explained in the present invention, little working or tamping in necessary, as the plasticity and void filling qualities are exceptionally good. Furthermore, reenforcement, such as strands of wire, metal lath or other rigid or semi-rigid reenforcement, can be incorporated without difficulties and can be easily kept in place. Metal reenforcement does not corrode on account of the waterproofing qualities of the mix. Further, the concrete or mixture has the waterproofing qualities due to the fact that the bentonite or swelling clay when it comes in contact with the water quickly enlarges, filling the voids of the structure and preventing further ingress of the moisture. The use of an oil in combining the waterproofing material with the mix is important as it allows the incorporation of a larger amount of the gelatinous clay, thus temporarily waterproofing it. As described, the temporary waterproofing of the clay is to prevent contact of the clay and water during gaging of the concrete, at which time the usual proportions of water are employed, that is, a sufficient amount of water required for hydration of the cement.

It will be noted that throughout the application the word "concrete" has been used to denote merely a mix or a mixture of the ingredients mentioned, as distinguished from the common use of concrete in the cement industry where it applies primarily to a cement containing calcareous material.

The particular character of the mix which differentiates it from a concrete or mix of similar nature and made up of similar ingredients, is the feature which is most clearly brought out by the slump test adopted by the American Society of Testing Materials in 1922 and described on pages 398 and 399 of the 1924 A. S. T. M. Tentative Standards. This test is a method of determining the consistency of Portland cement concrete which is ascertained by the tendency of a mass of such a material to slump from its original form. The material such as described in the present invention has a slump test of not more than 4 inches according to this standard, nor is there any appreciable segregation of water or draining off of the water attending this test. The slump test can be controlled by the amount of gelatinous clay for very wide ranges of water content. A gelatinous clay of this character, capable of taking up large amounts of water, forms a production which is not only light of weight when dried in a hardened condition, but is easily worked when in a plastic condition due to the presence of this water.

With regard to the relative amounts of water as compared to the amount of waterproofing material used, normally the amount of water present relative that of waterproofing material is as 20:1. Although such relation is typical, a range of from 30:1 or less is included within the scope of the invention. This range also depends upon the properties of the gelatinous clay used.

In addition to the light aggregates or fillers heretofore referred to, namely, cinders and clay heated to intumescence, a number of other materials such as natural light materials including pumice, tuffas, or other volcanic materials as well as honeycombed slag, which would naturally be included in the clays or cinders mentioned.

It is recognized, further, that diatomaceous earths when used alone have the characteristic of swelling slightly with additions of water and may have to a less extent the waterproofing properties of the bentonite or gelatinous adsorptive clay materials mentioned. For this reason, they may be used alone for the purposes mentioned in connection with the clay, but are normally not as satisfactory due to the fact that they are incapable of filling up the voids as completely as the clay material.

We claim as our invention:

1. A batch for concrete capable of being poured, made of a hydraulic matrix, mineral filler and a gelatinizing clay adapted to expand when brought in contact with moisture, and to hold the aggregate in suspension in the water vehicle, said mix weighing in the air dried condition between 85 and 130 pounds per cubic foot.

2. A batch for concrete capable of being poured, made of a hydraulic matrix, mineral filler and a gelatinizing clay adapted to expand when brought in contact with moisture, and to hold the aggregate in suspension in the water vehicle, said mix weighing in the air dried condition between 85 and 130 pounds per cubic foot and absorbing not more than 5% water after hydration and setting of the mix.

3. A composition of matter for building purposes containing a hydraulic cement matrix, fine and coarse filler, weighing on a dry basis not more than 130 pounds or less than 80 pounds per cubic foot and a gelatinizing clay capable of preventing the ingress of moisture and separation of the aggregate from the water vehicle.

ROY CROSS.
WILLIAM A. COLLINGS.